United States Patent [19]

Mori et al.

[11] Patent Number: 4,613,782

[45] Date of Patent: Sep. 23, 1986

[54] ACTUATOR

[75] Inventors: Kenji Mori, Tsuchiura; Toshio Ogiso, Ibaraki, both of Japan

[73] Assignee: Hitachi, Ltd., Tokyo, Japan

[21] Appl. No.: 712,851

[22] Filed: Mar. 18, 1985

[30] Foreign Application Priority Data

Mar. 23, 1984 [JP] Japan .................................. 59-54282
Jan. 21, 1985 [JP] Japan .................................. 60-7523

[51] Int. Cl.[4] .......................................... H01L 41/08
[52] U.S. Cl. .................... 310/323; 310/328; 310/329
[58] Field of Search ........................ 310/323, 328, 329

[56] References Cited

U.S. PATENT DOCUMENTS 3,649,857 3/1972 Knappe ................................ 310/323
4,339,682 7/1982 Toda et al. ...................... 310/328 X
4,547,086 10/1985 Matsumoto et al. ............ 310/328 X

FOREIGN PATENT DOCUMENTS 53-82286 7/1978 Japan .................................. 310/328

OTHER PUBLICATIONS

H. H. Anger, "Piezokeramische Vibronetoren", Feingeratetechnik, Oct. 1983, pp. 470–473.

*Primary Examiner*—Patrick R. Salce
*Assistant Examiner*—Emanuel Todd Voeltz
*Attorney, Agent, or Firm*—Antonelli, Terry & Wands

[57] ABSTRACT

An actuator for driving a driven member which comprises a base, first and second driving members each fixed to the base and having one vibrating direction, a resultant motion mechanism connected to the first and second driving members, combining their unidirectional vibrations and generating resultant vibration having circular orbit, a driving element transmitting the resultant motion of the resultant motion mechanism to the driven member, and a device for imparting excitation force to the first and second driving members.

8 Claims, 15 Drawing Figures

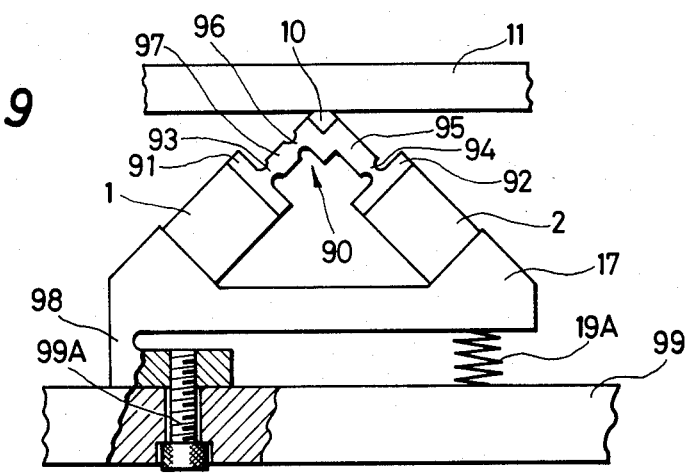

ACTUATOR

BACKGROUND OF THE INVENTION (1) Field of the Invention

This invention relates to an actuator which applies driving force to a driven member. More particularly, the present invention relates to an actuator which uses a piezo-electric device exhibiting a piezo-electric effect and applies driving force to a driven member.

(2) Description of the Prior Art

Actuators for applying driving force to a driven member are generally classified into the electric input type and the fluid input type. The former actuators are typified by electric motors while the latter actuators are typified by oil-pneumatic motors, oil-pneumatic cylinders and the like.

With the development of piezo-electric devices in recent years, various actuators using piezo-electric devices have been proposed. An example of such an actuator using piezo-electric devices is described on pages 470 to 473 in the chapter "Piezokeramische Vibromotoren" of the literature entitled "FEINGERATE-TECHNIK" published in October, 1983 in East Germany. This prior art reference discloses an actuator using piezo-electric devices in which the tips of two piezo-electric devices, that are disposed diagonally in such a manner as to cross each other, are connected by a coupling element in a triangular form in such a fashion that the vibration of each piezo-electric device makes the coupling element cause circular or elliptic motion, and this coupling element causing such a motion is brought into contact with a driven member so as to actuate the same.

In the actuator of the kind described above, the driven member is actuated by the coupling element causing a motion with a circular orbit that is obtained by the synthesis of the vibration displacement of alternate elongation and contraction of each piezo-electric device, and brought into contact with the driven member. In this instance, each piezo-electric device must undergo bending deformation; hence it must be thin. Therefore, each piezo-electric device is likely to suffer deformation such as buckling, and the driving force of each piezo-electric device is small so that the driving force applied to the driven member is also small. As a result, a large driving force can not be applied to the driven member.

SUMMARY OF THE INVENTION

It is an object of the present invention to provide an actuator which can supply great driving force to a driven member.

It is another object of the present invention to provide an actuator which is highly durable and highly reliable.

It is still another object of the present invention to provide an actuator which separates a vibration deformation generating component from a vibration synthesizing component to improve rigidity, and which can supply a great, stable driving force to a driven member.

To accomplish the objects described above, the present invention provides an actuator for a driven member which comprises a base; first and second driving members, each fixed to the base and having one vibrating direction; a resultant motion mechanism connected to the first and second driving members, and generating resultant vibration having a circular orbit by synthesizing the vibration displacement of the first and second driving members; a driving element disposed at the vibration end of the resultant motion mechanism and transmitting the resultant vibration to a driven member; and means for supplying exitation force to the first and second driving members. The actuator having such a construction can transmit great driving force to the driven member.

These and other objects, features and advantages of the present invention will become more apparent from the following description of some preferred embodiments to be taken in conjunction with the accompanying drawings.

BRIEF DESCRIPTION OF THE DRAWINGS

FIG. 9 is a schematic view showing the construction of an actuator in accordance with a fourth embodiment of the invention;

FIG. 10 is a schematic view showing the construction of an actuator in accordance with a fifth embodiment of the invention;

FIG. 11 is a schematic view useful for explaining the operation of the actuator of FIG. 10;

DESCRIPTION OF THE PREFERRED EMBODIMENTS

Figure 1:
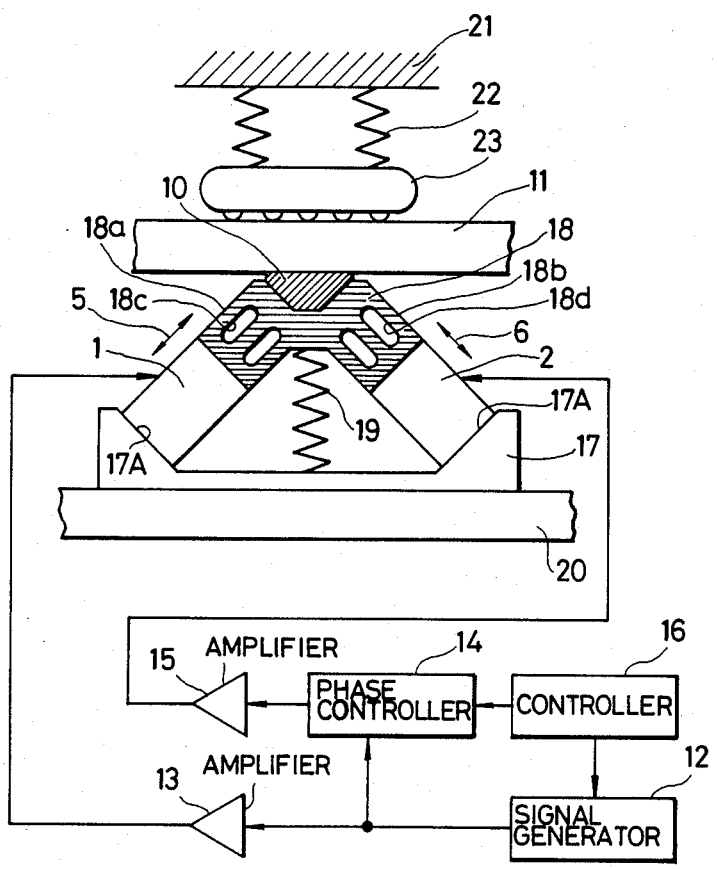
FIG. 1 is a schematic view showing the construction of an actuator in accordance with a first embodiment of the present invention.

FIG. 1 shows an actuator in accordance with a first embodiment of the present invention. In the drawing, reference numerals 1 and 2 represent rectangular piezo-electric devices using lead titanate/zirconate [$Pb(Zr, Ti)O_3$], abbreviation "PZT") and having a laminate structure to obtain great displacement at a low voltage. Reference numeral 10 represents a driving element made of an anti-abrasion material, and 11 represents a driven member. Reference numeral 17 represents a base which has an inclined surface of ±45° with respect to contact surface at the contact point between the driven member 11 and the driving element 10. The bottom of each piezo-electric device 1, 2 is fixed to the inclined surface 17A of the base 17.

Therefore, each piezo-electric device has a displacement component of ±40° with respect to the normal at the contact point between the driving element 10 and the driven member 11. The directions of mechanical displacement of the piezo-electric devices 1 and 2 are represented by arrows 5 and 6, respectively. A resultant motion mechanism 18 is disposed between each pizeoelectric device 1, 2 and the driving element 10. This mechanism 18 consists of a portion 18a facing the piezoelectric device 1 and a portion 18b facing the piezo-electric device 2. The part 18a of the resultant motion mechanism 18 is equipped with a slit 18c in the direction represented by the arrow 5 so that it transmits the force firmly in the direction of the arrow 5 and gently at right angles to the direction of the arrow 5. Similarly, the part 18b of the resultant motion mechanism 18 is equipped with a slit 18d so that it transmits the force firmly in the direction of the arrow 6 and gently at right angles to the direction of the arrow 6.

Therefore, the displacement of the piezo-electric device 1 causes displacement of the driving element 10 in the direction of the arrow 5 without being prevented by the piezo-electric device 2, and the displacement of the piezo-electric device 2 can displace the driving element 10 in the direction of the arrow 6 without being prevented by the piezo-electric device 1. The lower surface of the driving element 10 has a surface crossing at right angles the arrows 5 and 6 of the directions of displacement of the piezo-electric devices 1 and 2 in consideration of the transmission of force. Furthermore, the driving element 10, the resultant motion mechanism 18 and the piezo-electric devices 1 and 2 are fixed in a unitary structure.

A resilient element 19 is interposed between the resultant motion mechanism 18 and the base 17 so that compressive force is always applied to the piezo-electric devices 1 and 2. The base 17 is disposed on a fixed wall 20. The driven member 11 is pushed from the fixed wall 21, to the driving element 10 via the resilient element 22 and bearing means 23. Reference numeral 12 represents a signal generator, 13 is an amplifier, 14 is a phase controller, 15 is an amplifier and 16 is an operation controller. This controller 16 controls the frequency of the signal generator 12 and the phase of the phase controller 14.

The fundamental operation of the actuator of this first embodiment of the invention is that when a.c. voltages having an appropriate phase difference are applied to the piezo-electric devices 1 and 2, the respective displacements 5 and 6 are combined by the resultant motion mechanism 18, and the driving element 10 describes an elliptic orbit, thereby contact-driving the driven member 11 pushed thereto in one direction.

The operation of the actuator of this embodiment will be described in further detail with reference to FIG. 2.

Figure 2:
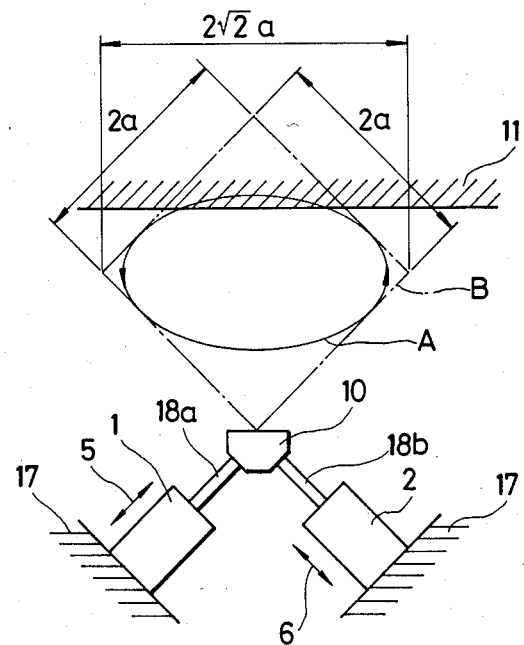
FIG. 2 is a diagram useful for explaining the operation of the actuator of the first embodiment.

FIG. 2 depicts schematically, in magnification, the operation of the actuator of the first embodiment of the invention. The range of motion of the driving element 10 falls within a square range B having one side 2a and inclined at 45° with a representing the maximum amplitude of each piezo-electric device 1, 2 disposed at an angle of ±45° with respect to the contact surface of the driven member 11. When maximum amplitude voltages having a suitable phase difference are applied between the piezo-electric devices 1 and 2, the orbit of motion A of the driving element 10 is an ellipse which is inscribed with the square B, and its elliptical characteristics depend upon the phase difference of the impressed voltages. The elliptic orbit shown in FIG. 2 corresponds to the case where the phase difference is about 120°.

To improve driving efficiency, it is preferred that the displacement in the direction perpendicular to the contact surface be minimized, and driving is effected with a flat elliptic orbit that enlarges the displacement in the direction of the contact surface. In accordance with the present invention, displacements of piezo-electric having a maximum amplitude a are combined with each other so that the displacement in the direction of the contact surface can be made approximate to $2\sqrt{2}a$. Therefore, when piezo-electric devices having the same performance are used, the present invention can more effectively utilize piezo-electric devices than the prior art technique. That is, since the displacement in the direction of the contact surface is about $\sqrt{2}$ as compared with the conventional system, the driving speed is $\sqrt{2}$ and the driving force is also about $\sqrt{2}$. The output of the actuator is $\sqrt{2} \times \sqrt{2} = 2$, and the driving efficiency can be remarkably improved.

In the first embodiment of the invention, the push force of the driven member to the driving element 10 acts as the compressive force for the piezo-electric devices 1 and 2, and the compressive force of the spring member 19 also acts upon the piezo-electric devices 1 and 2 so that the compressive force always acts upon the piezo-electric devices 1 and 2 which are in operation, and durability of the devices having little resistance to tensile stress can be drastically improved.

In the first embodiment of the invention described above, the resultant motion mechanism 18 is separate from the driving element 10, but the driving element 10 may be formed by applying abrasion resistance treatment such as ceramic coating on the surface of the resultant motion mechanism 18 that faces the driven member 11.

Next, some typical application examples of the actuator in accordance with the present invention will be described.

Figure 3:
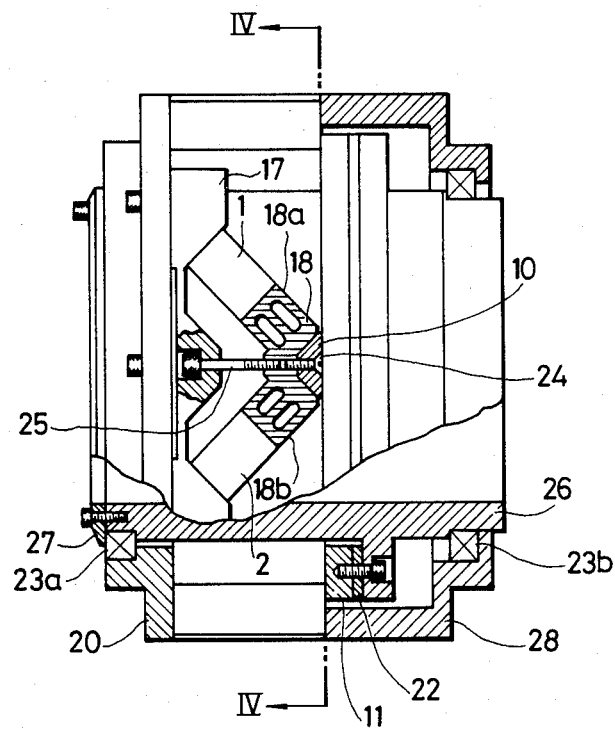
FIG. 3 is a front view, a partial cutaway, of a rotary actuator to which the actuator of the first embodiment of the invention is applied.
Figure 4:
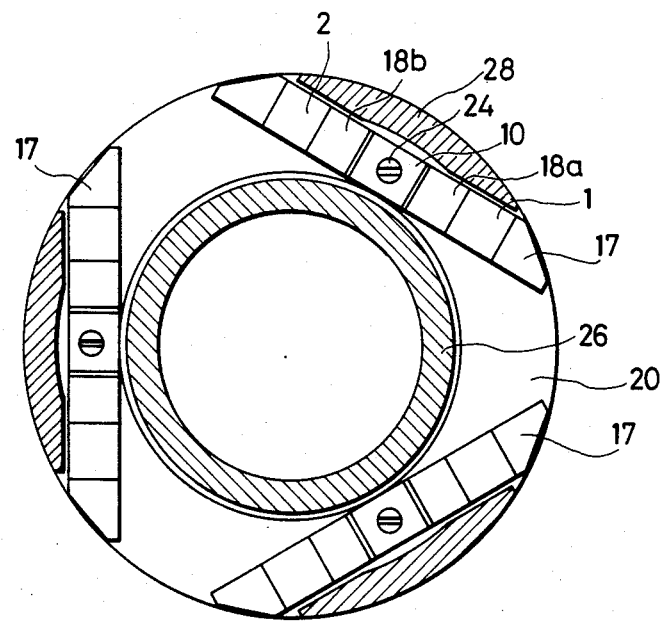
FIG. 4 is a sectional view taken along line IV—IV of FIG. 3.

FIGS. 3 and 4 show one application example of the actuator of the present invention. In this example, an actuator for rotating the driven member 11 is constituted. In these drawings, like reference numerals identify like constituents as in FIG. 2. In FIG. 3, the driving element 10 is fixed to the resultant motion mechanism 18 by a flat head screw 24. The resultant motion mechanism 18 and the base 17 are coupled at a part of the base 17 by a bolt 25 having a spring property as the spring member 19, thereby applying compressive force to the piezoelectric devices 1 and 2. In the rotary actuators of this embodiment, three units of the actuators of this invention are disposed on a disc-like fixed wall 20 as shown in FIG. 4, and a ring-like driven member 11 facing these actuator units is supported by three-point contact. Incidentally, only the actuator on the front side is shown disposed with the actuator at the rear being omitted. The driven member 11 is fixed to a rotor 26 via the spring member 22, and is further pushed by a set ring 27 to the driving end portion 10. The rotor 26 is supported by a rotary bearing that is interposed between the fixed wall 20 and a casing 28.

Next, the operation of this rotary actuator will be described. As described already in detail, when an a.c.

voltage having a suitable phase difference is applied to the piezo-electric devices 1 and 2, the driving element 10 causes elliptic motion. Therefore, when the driving elements 10 of the three actuators of the rotary actuator of this embodiment are made to cause elliptic motion in synchronism with one another, the driven member 11 that is contact-supported at three points and the rotor 26 can be continuously rotated in one direction. If the phase difference of the voltages applied to the piezo-electric devices 1 and 2 is reversed, the rotor 26 naturally rotates in reverse.

Figure 5:
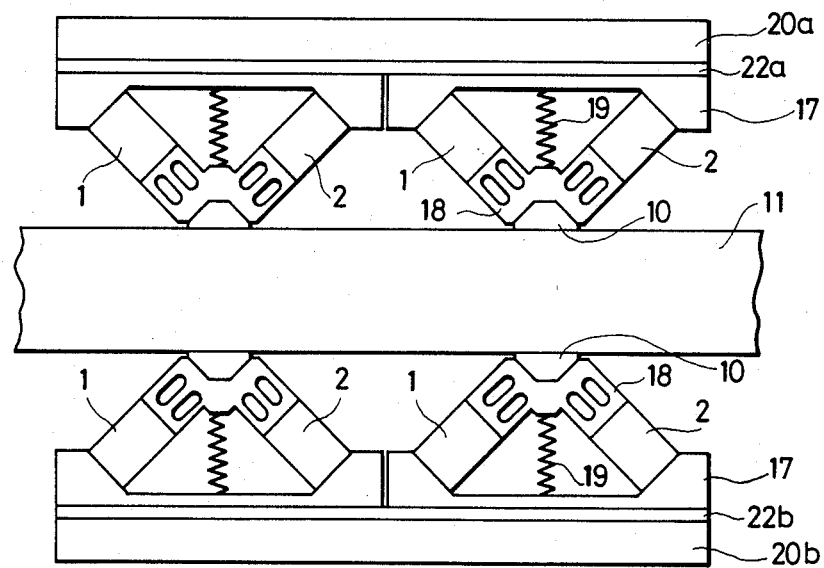
FIG. 5 is a schematic view showing a linear motion actuator to which the actuator of the first embodiment of the invention is applied.

FIG. 5 shows another application example of the actuator of the present invention. This embodiment illustrates an actuator which imparts linear motion to the driven member 11. Two actuators of the present invention are disposed on each of the fixed walls 20a and 20b facing each other, via the spring members 22a and 22b, respectively, and the driving elements 10 of the respective actuators push and support the driven member 11. When the actuators are operated in synchronism with each other in the same way as the operation of the rotary actuator described above, the driven member 11 can be driven continuously and in one direction.

As described above, the embodiment of the present invention can provide an actuator which can efficiently transmit the driving force to a driven member and moreover, can improve the durability of piezo-electric devices. Though the piezo-electric devices are arranged at an angle of 45°, the invention is not limited to this arrangement.

Figure 6:
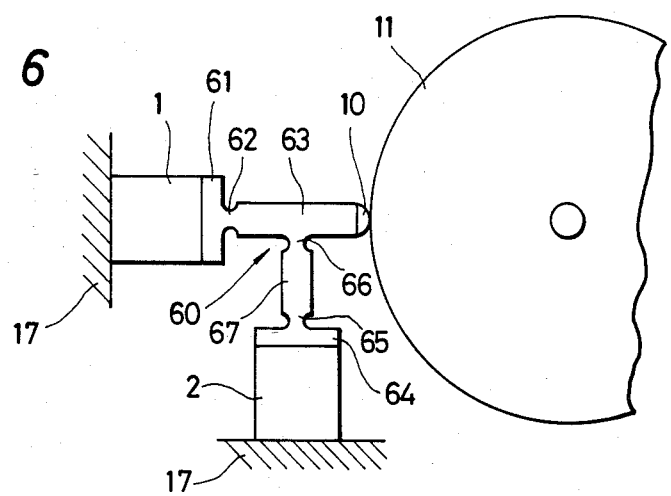
FIG. 6 is a schematic view showing the construction of an actuator in accordance with a second embodiment of the present invention.
Figure 7:
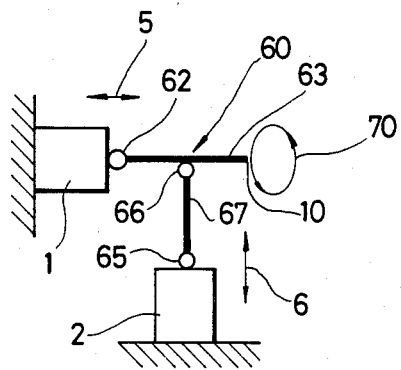
FIG. 7 is a schematic view useful for explaining the operation of the actuator shown in FIG. 6.

FIGS. 6 and 7 show schematically the construction and operation of the actuator in accordance with the second embodiment of the present invention. In the drawings, the piezo-electric device 1 is disposed on the base 17 in such a fashion that its displacing direction is perpendicular to the driven surface of the driven member 11, to change the pushing force to the driven member 11. The piezo-electric device 2 is disposed on the base 17 in such a fashion that its displacing direction is parallel to the driven surface of the driven member 11, and the driving force is applied thereto.

An oscillator is connected as a driving source to these piezo-electric devices 1 and 2. The resultant motion mechanism 60, which combines the vibration displacement of the piezo-electric devices 1 and 2 and transmits the resultant displacement to the driving element 10, consists of a joint 62 connected to the displacement end of the piezo-electric device 1 via a plate 61, a connecting member 63 connected to the joint 62, another joint 65 connected to the displacement end of the piezo-electric device 2 via a plate 64, a joint 66 disposed at the intermediate portion of the connecting member 63 and a connecting member 67 connecting the joints 65 and 66 to each other. These members are constructed in a unitary structure. Therefore, the joints 62, 65 and 66 together form a flexure hinge.

The joints 62, 65 and 66 are flexible with respect to rotary displacement at the joint center but are extremely rigid in the other directions. Therefore, the structure shown in FIG. 6 can be represented as a combined function of three pin joints and two rigid links as shown in FIG. 7.

In the second embodiment of the invention described above, the vibration displacement 5 of the piezo-electric device 1 and that 6 of the piezo-electric device 2 are combined in a predetermined manner by the resultant motion mechanism 60, and there is no possibility at all that vibration other than those applied to the piezo-electric devices 1 and 2 occurs in the driving element 10. When the phase difference between the vibration displacement 5 and the vibration displacement 6 is $\pi/2$, for example, the driving element 10 describes an elliptic orbit 70 such as shown in FIG. 7, comes into contact with the driven member 11 and can drive the same.

Figure 8:
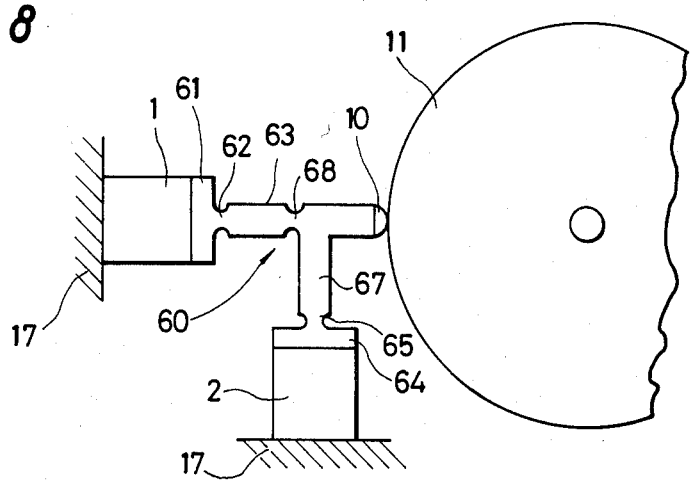
FIG. 8 is a schematic view showing the construction of an actuator in accordance with a third embodiment of the invention.

FIG. 8 shows the actuator in accordance with the third embodiment of the present invention. In the drawing, like reference numerals identify the same or like constituents as in FIG. 6. This embodiment has a construction in which the joint 66 in FIG. 6 is removed, the connecting member 67 is constructed in an L-shape, and the connecting member 63 is connected to this connecting member 67 by the joint 68.

In this construction, too, the displacement of the driving element 10 is determined solely by the displacement of the piezo-electric devices 1 and 2 in the same way as in the second embodiment shown in FIG. 6. Therefore, the vibration displacement of the piezo-electric devices can be transmitted firmly and accurately to the driving element, and a strong and uniform driving force can be obtained.

FIG. 9 shows the actuator in accordance with the fourth embodiment of the present invention. In this embodiment the piezo-electric devices 1 and 2 are fixed onto the base 17 in such a manner as to describe angles of ±45° with respect to the driven surface of the driven member 11. The displacement of the piezo-electric devices 1 and 2 are combined by the resultant motion mechanism 90. The driving element 10 at the tip of this mechanism 90 is equipped with an abrasion-resistant member and causes elliptic circular motion. The resultant motion mechanism 90 in this embodiment has the same construction as those of the second and third embodiments shown in FIGS. 6 and 8, respectively, and consists of the plates 91, 92 fixed to the displacement ends of the piezo-electric devices 1, 2, the joints 93, 94 disposed on the plates 91, 92, the connecting member 95 connected to the joint 94, the joint 96 disposed at the tip of the connecting member 95 and the connecting member 97 connecting the joint 96 to the joint 93.

The construction of the resultant motion mechanism 90 can accurately transmit the displacement of the piezo-electric devices 1 and 2 to the driving element 10 at their tip. When sinusoidal voltages having a phase difference of $\pi/2$ are applied to the piezo-electric devices 1 and 2, the driving element 10 causes circular motion, comes into contact with the driving member 11 and actuates the same.

In this embodiment, the base 17 is fixed onto the casing 99 by a bolt 99A via the flexure hinge 98, and the driving element 10 is pushed to the driven member 11 by the spring 19A so as to obtain the push force necessary for driving.

In the embodiment shown in FIG. 9, the pair of piezo-electric devices 1 and 2 are disposed diagonally with respect to the driven surface of the driven member 11, so that both of the piezo-electric devices 1 and 2 can be utilized equivalently and uniformly. Moreover, the reaction of the driving force when driving is made in both the normal and the reverse directions acts only as the compressive force upon the piezo-electric devices 1 and 2, so that the efficiency and durability as the actuator can be improved.

FIGS. 10 and 11 show schematically the construction and operation of the actuator in accordance with the fifth embodiment of the present invention. In FIG. 10, the pair of piezo-electric devices 1 and 2 are disposed on the base 17 in such a fashion that their displacing directions are perpendicular to the driven surface of the driven member 11. The resultant motion mechanism 100, which combines the displacement of the piezo-electric device 1 with that of the piezo-electric device 2 and transmits it to the driving element 10, consists of a base support 101 projecting from the base 17 between the piezo-electric devices 1 and 2, plates 102 and 103 fixed to the displacement ends of the piezo-electric devices 1 and 2, and four connecting members 111 through 114 that together connect the plates to seven joints 104 through 110. To obtain the push force for driving, one of the ends of the base 17 in this embodiment is fixed to the casing 116 via the flexure hinge 115, and the other end of the base 17 is pushed to the driven member 11 by push force adjusting means such as a bolt 117. In this case, the flexibility of the piezo-electric devices 1 and 2 is used in place of the spring 19A in the embodiment shown in FIG. 9, in order to simplify the construction.

Next, the operation of the actuator of the fifth embodiment of the invention will now be explained. As schematically shown in FIG. 11, the resultant motion mechanism 100 shown in FIG. 10 can be expressed as a link mechanism in which the four rigid links 111 through 114 are coupled to the support 101 and to the piezo-electric devices 1 and 2 by means of the seven pin joints 104 through 110. Since displacement 5 of the piezo-electric device 1 and that 6 of the piezo-electric device 2 can be transmitted with high rigidity and high fidelity to the driving element 10, a stable and great driving force can be obtained. When voltages having a suitable phase difference are applied to piezo-electric devices 1 and 2, for example, driving element 10 imparts elliptic circular motion as represented by reference numeral 118 and can drive the driven member 11.

The effect particularly brought forth by this embodiment is that since the pair of piezo-electric devices 1 and 2 are disposed in the same direction, the actuator can be made compact as a whole, and a greater number of actuators of the present invention can be incorporated in the same capacity, thereby increasing the driving force.

Figure 12:
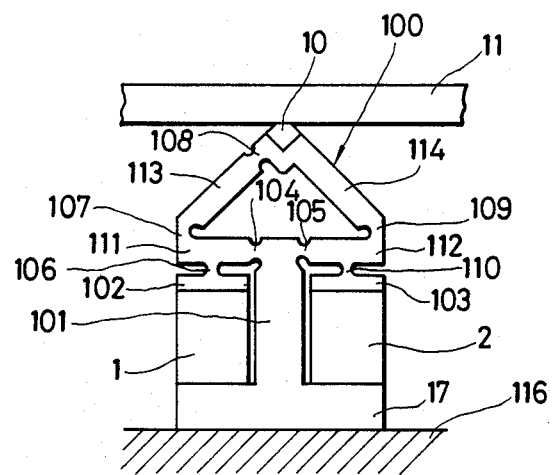
FIG. 12 is a schematic view showing the construction of an actuator in accordance with a sixth embodiment of the invention.
Figure 13:
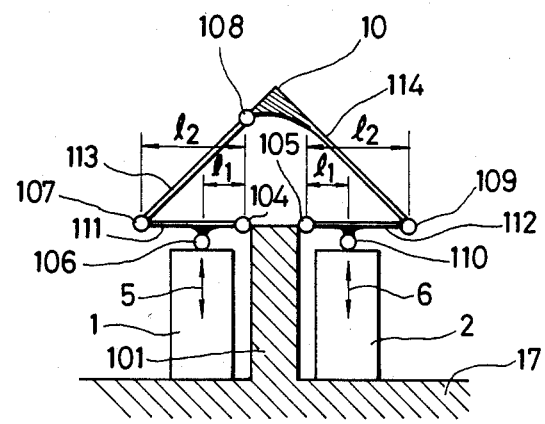
FIG. 13 is a schematic view useful for explaining the operation of the actuator of FIG. 12.

FIGS. 12 and 13 schematically show the construction and operation of the actuator in accordance with the sixth embodiment of the present invention. In the drawing, like reference numerals identify the same or like constituents as in FIGS. 10 and 11. In FIG. 12, the push mechanism to the driven member 11 is omitted.

This embodiment has a construction in which the connecting members 111 and 112 of the fifth embodiment shown in FIG. 10 are extended outward, the connecting members 113 and 114 are coupled to the ends of the connecting members 111 and 112 by the joints 107 and 109, and the piezo-electric devices 1 and 2 are coupled to the intermediate portions of the connecting members 111 and 112 by the joints 106 and 110, respectively.

This construction provides a strong, uniform driving force. Moreover, the distance $l_1$ between the joints 104, 105 connected to the base support 101 and the joints 106, 110 connected to the plates 102, 103, that are in turn fixed to the piezo-electric devices 1, 2, and the distance $l_2$ between the joints 104, 105 and the joints 107, 109 connected to the driving element 10 can be selected so as to satisfy the relation $l_2 > l_1$, so that the displacement of the piezo-electric devices 1 and 2 due to the lever ratio $l_2/l_1$ can be expanded, and the displacement of the driving element 10 can be increased by $l_2/l_1$ times the displacement of the driving element 10 in the fourth embodiment. Therefore, the actuator of this embodiment can improve the driving speed of the driven member 11.

In the embodiment described above, the distance $l_2$ and $l_1$ are selected so as to satisfy the relation $l_2 > l_1$. However, the force due to the piezo-electric devices 1 and 2 can be naturally expanded; hence, the driving force can be improved, by arranging the positions of the joints 106, 110, 107 and 109 so as to satisfy the relation $l_2 < l_1$.

Figure 14:
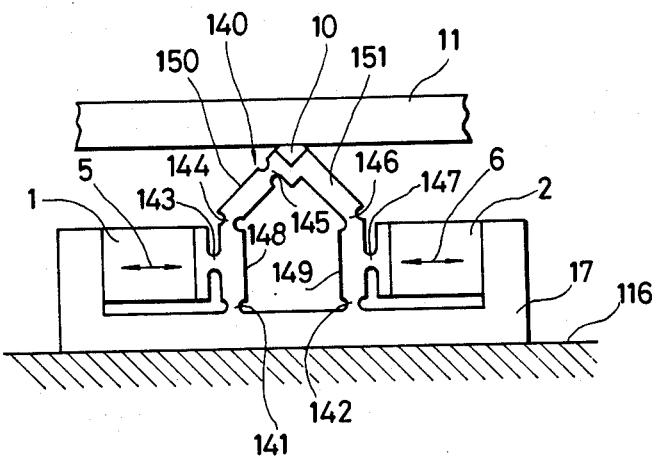
FIG. 14 is a schematic view showing the construction of an actuator in accordance with a seventh embodiment of the invention.

FIG. 14 shows the construction of the actuator in accordance with the seventh embodiment of the present invention. In the drawing, like reference numerals identify the same or like constituents as in FIG. 10. The pair of piezo-electric devices 1 and 2 are arranged on the base 17 so that their displacing directions 5 and 6 are parallel to the driven surface of the driven member 11. The resultant motion mechanism 140 that combines the displacement of the piezo-electric devices 1 and 2 with each other and transmits it to the driving element 10 consists of seven hinges 141 through 147 and four connecting members 148 through 151 to form a connected structure. The connecting members 148 and 149 are connected to the piezo-electric devices 1 and 2, respectively, by the joints 143 and 147 in a direction crossing at right angles to the oscillating direction of the piezo-electric devices 1 and 2. One end of each of these connecting members 148 and 149 is connected to the base 17 by the joints 141 and 142 with the other end of each being connected to the connecting member 150, 151 arranged diagonally by the joints 144, 146.

When sinusoidal voltages having a suitable phase difference are applied to the piezo-electric devices 1 and 2 in the same way as the fourth and fifth embodiments of the invention shown in FIGS. 9 and 10, the driving element 10 of this embodiment imparts an elliptic circular motion and can drive the driven member 11 with great and uniform force. Since the displacing directions of the piezo-electric devices 1 and 2 are arranged to be parallel to the driven surface of the driven member 11 in this embodiment, the thickness of the actuator can be reduced; hence, the space in the vertical direction can be reduced.

In this embodiment, too, the displacement or force can be naturally expanded and transmitted to the driven member 11 in the same way as in the sixth embodiment shown in FIG. 2 by selecting a suitable position relation between the joints 144 and 146 connected to the driving element 10 and the joints 143 and 147 connected to the piezo-electric devices 1 and 2.

In the actuators of the present invention described above, the load mass to the piezo-electric devices 1 and 2 is small so that the driving frequency of the piezo-electric devices can be enlarged to some dozens of KHz, and the driving speed can be relatively increased. The quantity of displacement 6 at the tip of the piezo-electric device can be expressed by the following formula when the piezo-electric device consists of a laminate piezo-electric element, its dielectric constant in the laminate direction is $d_{33} (= 600 \times 10^{-12}$ m/V), the number of the layer of the piezo-electric element $n (=50)$ and the impressed voltage is V (peak-to-peak voltage of the A.C. impressed voltage $=50$ V):

$$\delta = nd_{33}V$$
$$= 50 \times 600 \times 10^{-12} \text{ [m/V]} \times 50 \text{ [V]}$$

$$= 1.5 \times 10^{-6} \, [m]$$

$$= 1.5 \, \mu m$$

Therefore, when a.c. voltages having a phase difference of $\pi/2$ are applied to the pair of piezo-electric devices constituting the actuator, the driving element in the embodiment described above imparts circular motion of a diameter $\delta = 1.5 \, [\mu m]$, and the peripheral speed v of the driving element can be expressed by the following formula with the driving frequency f being 20 KHz:

$$v = \frac{\delta}{2} \times 2\pi f$$

$$= 1.5 \times 10^{-6} \, [m] \times 20 \times 10^3 \times \pi \, [1/s]$$

$$= 9.4 \times 10^{-2} \, [m/s]$$

$$= 10 \, [cm/s]$$

Therefore, if a rotary actuator is constituted by use of the actuator of the present invention, a relatively large rotating speed of from several rotations per minute to some dozens of rotations per minute can be obtained.

In the embodiments of the invention described above, the joints consist of the flexure hinges formed integrally with the connecting members, but they may consist of pin joints. Displacement members other than the piezo-electric devices can also be used.

Figure 15:
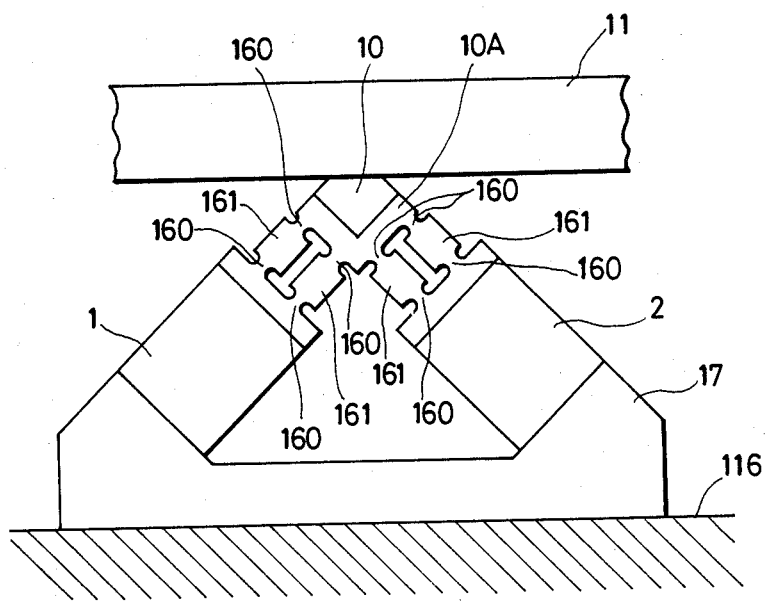
FIG. 15 is a schematic view showing the construction of an actuator in accordance with an eighth embodiment of the invention.

It is further possible in the present invention to constitute the two connecting members, that are diagonally connected to combine the displacement quantities of the two piezo-electric devices, by those connecting members which are parallel to each other and have hinges at their both ends. An example of such a construction will be described with reference to the embodiment shown in FIG. 15. That is, two connecting members 161 having hinges 160 at both their ends connect the member 10A having the driving element 10 to the piezo-electric device 1 and the member 10A to the piezo-electric device 2, respectively, as depicted in FIG. 15. Such a construction can of course be employed for the other embodiments of the invention.

As described in detail above, the present invention can transmit the displacement of the pair of piezo-electric devices to the driving element firmly and accurately by means of the resultant motion mechanism consisting of a plurality of hinges and a plurality of connecting members. Therefore, the actuator of the present invention can provide great and uniform driving force as well as a relatively great driving speed.

What is claimed is:

1. An actuator to drive a driven member, comprising:
   a base;
   a first driving member fixed to said base and having one vibrating direction;
   a second driving member having one vibrating direction and fixed to said based in such a fashion that the vibrating direction thereof crosses that of said first driving member;
   a resultant motion mechanism coupled to said first and second driving members and generating resultant vibration having circular orbit by combining their unidirectional vibrations with each other;
   a driving element disposed at the vibrating end of said resultant motion mechanism and transmitting the resultant displacement to said driven member;
   means for supplying excitation force to said first and second driving member; and
   wherein said first and second driving members consist of piezo-electric devices and wherein said resultant motion mechanism is equipped with a connecting member connecting said driving element to said first and second driving members, and said connecting member is equipped with a slit extending in the vibrating direction of each of said driving members.

2. An actuator to drive a driven member, comprising:
   a base;
   a first driving member fixed to said base and having one vibrating direction;
   a second driving member having one vibrating direction and fixed to said based in such a fashion that the vibrating direction thereof crosses that of said first driving member;
   a resultant motion mechanism coupled to said first and second driving members and generating resultant vibration having circular orbit by combining their unidirectional vibrations with each other;
   a driving element disposed at the vibrating end of said resultant motion mechanism and transmitting the resultant displacement to said driven member;
   means for supplying excitation force to said first and second driving member; and
   wherein said first and second driving members consist of piezo-electric devices and wherein said resultant motion mechanism comprises:
   an L-shaped first connecting member having one of the ends thereof functioning as a resultant vibration end;
   a first joint connecting the other end of said first connecting member to the vibration end of said second driving member;
   a second connecting member;
   a second joint connecting one of the ends of said second connecting member to the vibration end of said first driving member; and
   a third joint connecting the other end of said second connecting member to the bent portion of said first connecting member.

3. An actuator to drive a driven member, comprising:
   a base;
   a first driving member fixed to said base and having one vibrating direction;
   a second driving member having one vibrating direction and fixed to said based in such a fashion that the vibrating direction thereof crosses that of said first driving member;
   a resultant motion mechanism coupled to said first and second driving members and generating resultant vibration having circular orbit by combining their unidirectional vibrations with each other;
   a driving element disposed at the vibrating end of said resultant motion mechanism and transmitting the resultant displacement to said driven member;
   means for supplying excitation force to said first and second driving member; and
   wherein said first and second driving members consist of piezo-electric devices and wherein said resultant motion mechanism comprises parallel connecting members and joints that connect said driving element to said first and second driving members, each of said joints consisting of a flexure hinge.

4. An actuator for driving a driven member, comprising:
   a base;
   a first driving member fixed to said base and having one vibrating direction;
   a second driving member having one vibrating direction and fixed to said base in such a fashion that the vibrating direction thereof is in parallel with that of said first driving member;
   a resultant motion mechanism coupled to said first and second driving members and combining their unidirectional vibrations to form resultant vibration having a circular orbit;
   a driving element disposed at the vibration end of said resultant motion mechanism and transmitting the resultant vibration of said resultant motion mechanism to said driven member; and
   means for supplying excitation force to said first and second driving members.

5. The actuator as defined in claim 4 wherein said first and second driving members consist of piezoelectric devices, respectively.

6. The actuator as defined in claim 5 wherein said resultant motion mechanism includes:
   a support member disposed between said first and second driving members;
   a first connecting member having a first member extending in the vibrating direction of said driving member and a second member extending in a direction at right angles with the extending direction of said first member, and having one of the ends thereof connected to said support member by a joint and the other end connected to said first driving member by another joint;
   a second connecting member having a first member extending in the vibrating direction of said second driving member and a second member extending in a direction at right angles with the extending direction of said first member, and having one of the ends thereof connected to said support member by a joint and the other end connected to said second driving member by another joint;
   a third connecting member having one of the ends thereof connected to the other end of said first connecting member by a joint and the other end forming a resultant vibration end; and
   a fourth connecting member having one of the ends thereof connected to the other end of said second connecting member by a joint and the other end connected to the resultant vibration end of said third connecting member by another joint.

7. The actuator as defined in claim 5 wherein said resultant motion mechanism includes:
   a support member disposed between said first and second driving members;
   a first connecting member having a first member extending in the vibrating direction of said first driving member and a second member extending in a direction at right angles with the extending direction of said first member, and having one of the ends thereof connected to said support member by a joint and the other end connected to said first driving member by another joint;
   a second connecting member having a first member extending in the vibrating direction of said second driving member and a second member extending in a direction at right angles with the extending direction of said first member, and having one of the ends thereof connected to said support member by a joint and the other connected to said second driving member by another joint; and
   parallel third connecting members connecting the other ends of said first and second connecting members to said driving element by joints, respectively.

8. The actuator as defined in claim 6 or 7 wherein each of said joints consists of a flexure hinge.

* * * * *